United States Patent
Jehle et al.

(10) Patent No.: US 9,624,585 B2
(45) Date of Patent: Apr. 18, 2017

(54) FLUID CHAMBER DEVICE FOR A REACTION UNIT OF A REDOX DEVICE

(71) Applicant: Astrium GmbH, Taufkirchen (DE)

(72) Inventors: Walter Jehle, Horgenzell (DE); Stefan Kaul, Hermsbach (DE)

(73) Assignee: Airbus DS GmbH, Taufkirchen (DE)

( * ) Notice: Subject to any disclaimer, the term of this patent is extended or adjusted under 35 U.S.C. 154(b) by 99 days.

(21) Appl. No.: 14/311,650

(22) Filed: Jun. 23, 2014

(65) Prior Publication Data

US 2014/0374244 A1 Dec. 25, 2014

(30) Foreign Application Priority Data

Jun. 25, 2013 (EP) .................................. 13173675

(51) Int. Cl.
| | |
|---|---|
| *C25B 1/10* | (2006.01) |
| *C25B 9/00* | (2006.01) |
| *C25B 1/04* | (2006.01) |
| *H01M 2/08* | (2006.01) |
| *H01M 8/20* | (2006.01) |
| *H01M 10/12* | (2006.01) |
| *H01M 2/22* | (2006.01) |
| *C25B 9/08* | (2006.01) |
| *H01M 8/18* | (2006.01) |

(Continued)

(52) U.S. Cl.
CPC ................. *C25B 9/00* (2013.01); *C25B 1/04* (2013.01); *C25B 1/10* (2013.01); *C25B 9/08* (2013.01); *H01M 8/0276* (2013.01); *H01M 8/186* (2013.01); *H01M 8/0284* (2013.01); *Y02E 60/366* (2013.01); *Y02E 60/528* (2013.01)

(58) Field of Classification Search
CPC .......... H01M 2/08; H01M 2/365; H01M 8/20; H01M 8/2485; H01M 10/12; H01M 2/22; C25B 9/00; C25B 1/04; C25B 1/10
USPC .................................. 204/242; 429/460, 508
See application file for complete search history.

(56) References Cited

U.S. PATENT DOCUMENTS

| | | |
|---|---|---|
| 4,654,134 A | 3/1987 | Morris et al. |
| 2006/0266641 A1 | 11/2006 | Friedman et al. |

(Continued)

FOREIGN PATENT DOCUMENTS

| | | |
|---|---|---|
| DE | 10 2011 100 768 A1 | 12/2012 |
| EP | 2 455 046 A1 | 4/2012 |

OTHER PUBLICATIONS

Extended European Search Report dated Nov. 26, 2013 issued in corresponding EP patent application No. 13173675.3 (and partial English translation).

(Continued)

*Primary Examiner* — Zulmariam Mendez
(74) *Attorney, Agent, or Firm* — Posz Law Group, PLC

(57) ABSTRACT

A fluid chamber device for a reaction unit of a redox device, includes at least one first wall element and at least one second wall element which at least partially delimit a fluid chamber, and a sealing region which closes off the fluid chamber against a fluid exchange, in particular a gas exchange, in relation to a surrounding space. At least one of the wall elements, in an installed state, has at least one sealing contour in the sealing region, which is intended for providing a sealing effect and by means of which a spacing of the at least two wall elements in the sealing region is reduced in relation to a surrounding area of the sealing region.

20 Claims, 2 Drawing Sheets

Figure 1:
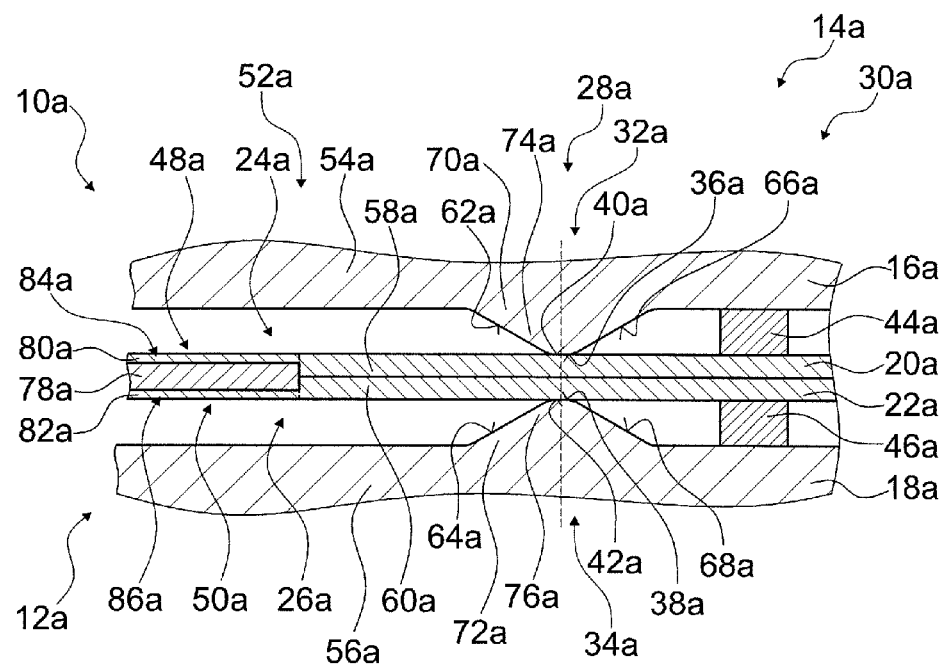

(51) Int. Cl.
*H01M 8/0276* (2016.01)
*H01M 8/0284* (2016.01)

(56) References Cited

U.S. PATENT DOCUMENTS

| | | |
|---|---|---|
| 2008/0143061 A1 | 6/2008 | Steinbach et al. |
| 2009/0280375 A1 | 11/2009 | Obika |
| 2014/0093811 A1 | 4/2014 | Kiefer et al. |
| 2015/0132621 A1* | 5/2015 | Henrici ............... H01M 2/0275 429/90 |

OTHER PUBLICATIONS

Office Action dated Dec. 29, 2015 issued in corresponding CA patent application No. 2,854,151.

* cited by examiner

FLUID CHAMBER DEVICE FOR A REACTION UNIT OF A REDOX DEVICE

PRIOR ART

The invention relates to a fluid chamber device according to the preamble of Claim 1.

Fluid chamber devices with sealing regions, in which a sealing element is arranged between two wall elements extending in parallel, are already known.

The objective of the invention is in particular to provide a generic-type device with improved characteristics with regard to a simple construction. The objective is achieved according to the invention by means of the features of patent Claim 1, whereas advantageous embodiments and developments of the invention can be gathered from the dependent claims.

Advantages of the Invention

The invention is based on a fluid chamber device for a reaction unit of a redox device, having at least one first wall element and at least one second wall element which at least partially delimit a fluid chamber, and having a sealing region which closes off the fluid chamber against a fluid exchange, a gas exchange, in relation to a surrounding space.

It is proposed that at least one of the wall elements, in an installed state, has at least one sealing contour in the sealing region which is intended for providing a sealing effect and by means of which a spacing of the at least two wall elements in the sealing is reduced in relation to an surrounding area of the sealing region.

To be understood by a "fluid chamber device" is in particular a device having at least one fluid chamber which is delimited by at least one wall element. To be understood by a "fluid chamber" is in particular a chamber for a retention and/or conducting of a fluid, in particular a gas, which at least substantially avoids an unregulated escape of the fluid into an environment. To be understood by "at least substantially avoids an unregulated escape of the fluid into an environment" is in particular that a leakage rate of the fluid is at most one percent of a starting quantity, held in the fluid chamber, per hour. To be understood by a "reaction unit" is in particular a unit having a fluid chamber which is provided for an execution of a chemical reaction, for example an electrochemical reaction. To be understood by a "redox device" is in particular a device having at least one redox unit. The redox device is preferably designed as a hydrogen-oxygen redox device having at least one hydrogen-oxygen unit. To be understood by a "redox unit" is a unit having at least two electrodes, of which one is preferably designed as a hydrogen electrode and one as an oxygen electrode, having a current circuit which connects the two electrodes, having at least one electrolyte which is arranged at least between the two electrodes and/or having an electrolyte-filled or ion-conducting membrane which is arranged at least between the two electrodes, wherein by means of the unit a redox reaction is carried out, during which—with release of energy in the form of electric power which is released via the current circuit—the first gas is oxidized and the second gas is reduced and in a reaction they are converted to form a product substance, preferably water, which is discharged to an environment or to a storage tank, or during which—with expenditure of energy in the form of electric power—an educt substance, preferably water, is decomposed to produce a first gas, preferably molecular hydrogen, and a second gas, preferably molecular oxygen, and the first gas and the second gas are discharged to the environment or into storage tanks. The redox unit is in particular designed as a fuel cell in which—with release of energy by means of current generation—molecular hydrogen, preferably in the form of hydrogen gas, and molecular oxygen, preferably in the form of oxygen gas, react to form water, and/or as an electrolyzer for hydrogen and oxygen, in which—with absorption of energy by means of an electric current—water is decomposed into molecular oxygen and molecular hydrogen. In principle, instead of water as a product substance or educt substance another chemical substance which contains hydrogen atoms and oxygen atoms can be used. For example, instead of being designed as a hydrogen-oxygen redox unit the redox unit can be designed as a redox unit for other substances which converts the other substances in a redox reaction similar to the redox reaction of the hydrogen-oxygen redox unit, for example as a carbon monoxide-oxygen redox unit which converts carbon monoxide and oxygen gas to form carbon dioxide or decomposes carbon dioxide into carbon monoxide and oxygen gas. To be understood by a "redox reaction" is in particular a reaction in which at least two chemical substances react with each other, wherein at least one chemical substance releases electrons and is therefore oxidized, and at least one chemical substance absorbs electrons and is therefore reduced. To be understood by "hydrogen gas" is in particular hydrogen in molecular form which exists as gas. To be understood by "oxygen gas" is in particular oxygen in molecular form which exists as gas. To be understood by "provided" is in particular specifically programmed, designed and/or equipped. To be understood by an object being provided for a specific function is in particular that the object fulfills and/or implements this specific function in at least one application state and/or operating state. To be understood by a "sealing region" is in particular a region of the fluid chamber device which closes off the fluid chamber against a fluid exchange with a surrounding space The sealing region can in particular have a sealing element, for example an O-ring, a rubber seal or an indium seal, which closes off a gap between two wall elements of the fluid chamber device with sealing effect. To be understood by a "surrounding space" is in particular a space outside the fluid chamber device, in particular outside the redox device. The surrounding space is in particular different from and separated from a process section in which an execution of a chemical reaction, in particular a redox reaction, is provided and/or products or educts of the chemical reaction are stored. To be understood by a "sealing contour" is in particular a shape of at least one of the wall elements which differs from a shape outside the sealing region and which provides a sealing effect. A plurality of sealing contours can in particular be arranged consecutively, in particular consecutively in a radial direction of the fluid chamber device. To be understood by a "surrounding area of the sealing region" is in particular an area in a vicinity of the sealing region, wherein the surrounding area can extend in the process section and/or into the surrounding area. The sealing region can in particular have an additional sealing element in addition to the sealing contour, for example a sealing ring and/or a coating on the first wall element and/or on the second wall element, which can in particular be inserted into the sealing contour. A sealing effect of the sealing contour is in particular largely independent of a gravitational effect and/or of an external pressure, as a result of which the fluid chamber device can in particular be advantageously used for an application under conditions of reduced of gravitational force. To be understood by "conditions of reduced gravitational force"

are in particular conditions in which a gravitational effect of at most 0.9 g, advantageously at most $1*10^{-3}$ g, preferably at most $1*10^{-6}$ g and in particular preferably $1*10^{-8}$ g, is effective. The gravitational effect can be created by gravitation and/or created artificially by an acceleration. The value of the fall acceleration on earth of 9.81 m/s² is identified by "g". A reduction of a number of required sealing elements of the sealing region can in particular be achieved and a particularly simple construction of the fluid chamber device can be achieved.

It is also proposed that the at least two wall elements have a spacing of at most 0.5 mm in the sealing region. A cross section for sealing can in particular be reduced and a high sealing effect can in particular be achieved.

It is furthermore proposed that the at least one first wall element and the at least one second wall element each have a sealing surface in the sealing region, which in an installed state provides a gastight sealing effect. To be understood by a "sealing surface" is in particular a surface which provides a sealing effect. To be understood by an "installed state" is in particular a state in which the at least one first wall element and the at least one second wall element are installed one on top of the other. A high sealing effect can in particular be achieved.

It is also proposed that the at least two wall elements are in direct contact with each other in the region of the sealing surfaces. As a result of the direct contact with each other the gastight sealing effect is in particular achieved. Additional sealing elements for closing off the fluid chamber against a fluid exchange with the environment can in particular be dispensed with.

It is furthermore proposed that the sealing surfaces are each of basically a strip-like design. To be understood by a "sealing surface of strip-like design" is in particular a sealing surface which has an extent in a direction perpendicular to a main extension direction, which is at most ten percent, advantageously at most five percent and preferably at most one percent of an extent in the main extension direction. The main extension direction of the sealing surface is formed in particular by a radial direction of the fluid chamber device. A high sealing effect can in particular be achieved.

It is also proposed that the sealing surfaces have a width of less than 1 mm, advantageously less than 0.5 mm. To be understood by a "width of the sealing surfaces" is in particular an extent of the sealing surfaces in a direction which is perpendicular to the main extension direction of the sealing surface. A high sealing effect can in particular be achieved.

It is also proposed that the fluid chamber device has at least one tensioning part element which provides a pressing force acting upon the sealing surfaces for a pressure-resistant sealing effect. To be understood by a "pressure-resistant sealing effect" is in particular a sealing effect in which in the case of a pressure difference between the fluid chamber and the surrounding space of 60 bar, advantageously 80 bar and preferably 100 bar, a pressure loss and/or pressure increase of at most 0.01 bar per hour occurs. For example, the tensioning part element can be designed as a frame which encompasses the fluid chamber device and by screwing action exerts a pressure upon the fluid chamber device. A material of the first wall element and of the second wall element preferably has an adequate elasticity so that as a result of the pressing force a reversible elastic deformation is achieved. A high sealing effect can in particular be achieved.

It is furthermore proposed that the fluid chamber device has at least one spacer element arranged between the at least one first wall element and the at least one second wall element, which is provided for limiting the pressing force acting upon the contact surfaces. To be understood by a "spacer element" is in particular an element with a material elasticity which is significantly lower, in particular at least by five percent lower, advantageously at least by ten percent lower, and prefer at least by twenty percent lower than a lowest material elasticity of the first wall element and/or of the second wall element. The spacer element is in particular provided for limiting the pressing force in order to avoid a plastic deformation of the first wall element and/or of the second wall element as a result of the pressing force. The sealing region can therefore in particular be reversibly opened in case of need.

It is furthermore proposed that the at least one sealing contour is designed as a bulge of the at least one wall element, the bulge having a crest upon which is arranged the sealing surface of the at least one other wall element. To be understood by a "bulge" is in particular a raised area of the wall element in the region of a strip, preferably by means of an increase, at least on one side, of the thickness of the wall element and/or by means of a wave-like shape along a width of the strip. The bulge can in particular be designed as a solid contour in which a thickness of the wall element changes and/or as a contour with a constant thickness in which a shape of the wall element changes. A sealing contour which can be simply produced with regard to construction engineering can in particular be achieved.

It is also proposed that the wall elements are formed at least substantially from different materials. To be understood by "at least substantially different materials" is in particular that materials of the first wall element and of the second wall element differ at least with regard to at least one material parameter, such as a hardness, a specific weight or an electrical conductivity and advantageously consist at least partially of different types of atom and different types of molecule. Different material classes are preferably associated with materials of the first wall and/or of the second wall element. For example, the first wall element can consist of a plastic material and the second wall element can consist of a metallic material. The first wall element can in particular consist at least partially of polyetherketone and/or polysulfone, wherein additional substances can be introduced into a matrix consisting of polyetherketone and/or polysulfone.

The second wall element can in particular consist at least partially of an electrically conducting material with a high yield point, preferably of a metallic material such as a sheet metal with nickel content. A specific match of characteristics of the wall elements to requirements of the respective reaction unit can in particular be achieved.

It is furthermore proposed that a main extent of the wall elements is at least 30 times a height of the fluid chamber. To be understood by a "height of the fluid chamber" is in particular an average distance of the at least one first wall element and of the at least one second wall element which the at least one first wall element and the at least one second wall element has in a region of a geometric center of the fluid chamber and in a region—which includes at least ninety percent of a volume of the fluid chamber—centered around the geometric center of the fluid chamber. The fluid chamber is preferably designed so that it has a constant height with the exception of edge regions. A compact fluid chamber device can in particular be achieved.

It is also proposed that at least one of the wall elements has a fluid-permeable partial region. To be understood by a "fluid-permeable partial region" is in particular a region through which a fluid can pass, for example by diffusion through a lattice of atoms and/or molecules of a material of the fluid-permeable partial region or through openings and/or pores of the fluid-permeable partial region which are specifically provided for this. The fluid-permeable partial region is preferably formed in one piece with an electrode of the redox device. A fluid-permeable connection from the fluid chamber to a functional element of the redox device, such as a membrane, and/or an additional fluid chamber, is therefore in particular achieved. Dispensing with additional fluid-permeable wall elements can in particular be achieved.

Also proposed is a redox device having at least one first fluid chamber device according to the invention and at least one second fluid chamber device according to the invention. The at least one first fluid chamber device according to the invention and the at least one second fluid chamber device according to the invention in particular each form a half-cell of a reaction region of the redox device.

It is furthermore proposed that the fluid chamber devices are arranged directly adjacently to each other in a direction which is perpendicular to a main extent. A plurality of redox devices can in particular be arranged directly adjacently to each other, wherein fluid chamber devices of directly adjacent redox devices are in particular arranged in the form of a so-called stack, for example. A space-saving arrangement of a plurality of fluid chamber devices can in particular be achieved.

It is also proposed that the fluid chamber devices are arranged in a mirror-image manner in relation to each other in a direction which is perpendicular to a main extent. At least one first wall element or at least one second wall element of the at least one first fluid chamber device and at least one first wall element or at least one second wall element of the at least one second fluid chamber device in particular butt against each other and are substantially of a like design. To be understood by "are substantially of a like design" is in particular that they consist of the same material. A directly adjacent arrangement which is simple to construct with regard to construction engineering can in particular be achieved.

The fluid chamber device according to the invention is not intended in this case to be limited to the above-described application and embodiment. The fluid chamber device according to the invention, for fulfilling a principle of operation described herein, can in particular have a number of individual elements, components and units which differs from a number referred to herein.

DRAWINGS

Further advantages are gathered from the following drawing description. In the drawings, two exemplary embodiments of the invention are shown. The drawings, the description and the claims contain numerous features in combination. The person skilled in the art will expediently also take the features into consideration individually and group them to form meaningful further combinations.

Figure 2:
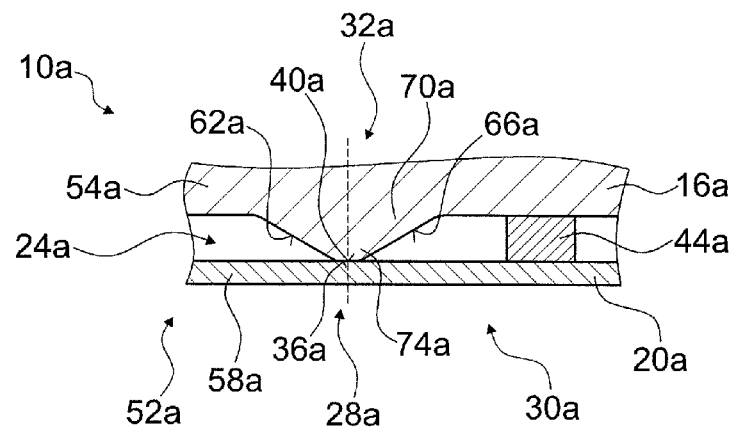
Figure 3:
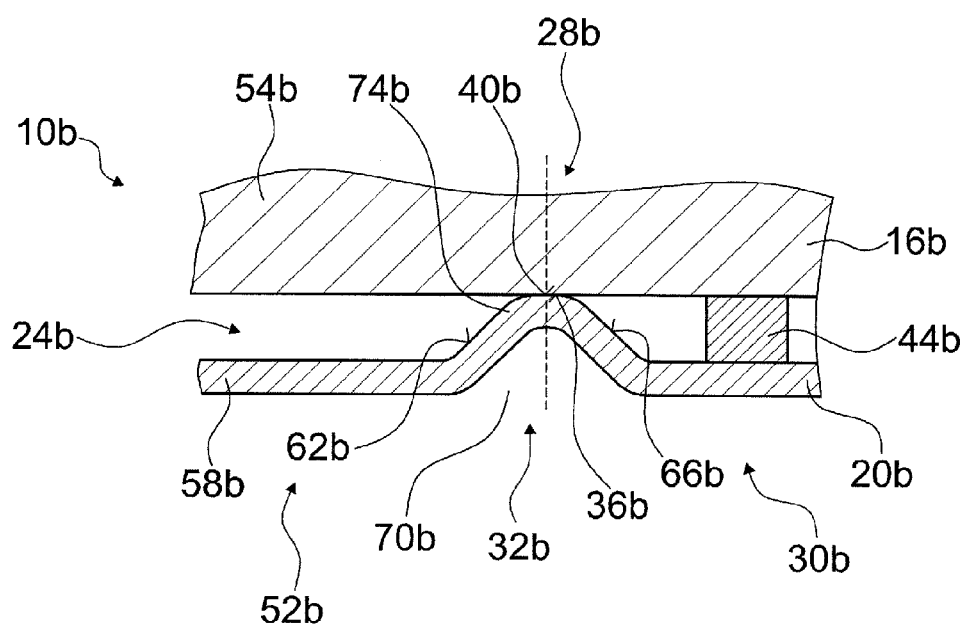

In the drawing:

FIG. 1 shows a section in the radial direction through an edge region of a redox device having two fluid chamber devices according to the invention, FIG. 2 shows a section in the radial direction through one of the fluid chamber devices of the redox device, and FIG. 3 shows a section in the radial direction through a fluid chamber device of a redox device of a further exemplary embodiment.

DESCRIPTION OF THE EXEMPLARY EMBODIMENTS

FIG. 1 shows a detail of a redox device 14 having a first and a second fluid chamber device 10a, 12a. A section in the radial direction in an edge region of the redox device is shown. The fluid chamber devices 10a, 12a are designed in a similar manner to each other, which is why only the first fluid chamber device 10a is described in more detail in the following text.

In this case, the designations refer in each case to the corresponding elements both of the first fluid chamber device 10a and of the second fluid chamber device 12a. The fluid chamber device 10a, 12a comprises a first wall element 16a, 18a and a second wall element 20a, 22a. The wall elements 16a, 18a, 20a, 22a delimit a fluid chamber 24a, 26a and have a sealing region 28a which closes off the fluid chamber 24a, 26a against a gas exchange in relation to a surrounding space 30a. The redox device 14 is designed as an electrolyzer for decomposition of water into hydrogen and oxygen. The fluid chamber device 10a, 12a is designed as a half-cell of the electrolyzer (cf. FIG. 2). The redox device 14a has a process section 52a which comprises the fluid chamber 24a, 26a of the fluid chamber device 10a, 12a.

The first wall element 16a, 18a and the second wall element 20a, 22a consist substantially of different materials. The first wall element 16a, 18a consists of an electrically insulating material. The first wall element 16a, 18a consists of a thermoplastic material. The first wall element 16a, 18a consists of a polysulfone material. The first wall element 16a, 18a comprises a disk-like basic body 54a, 56a. The basic body 54a, 56a has a diameter of 70 mm and a thickness of 18 mm. The diameter of the basic body 54a, 56a corresponds to a main extent of the first wall element 16a, 18a. The second wall elements 20a, 22a consists of a metallic electrically conducting material which has a high yield strength. The second wall element 20a, 22a consists of a sheet metal with nickel content. The second wall element 20a, 22a comprises a disk-like basic body 58a, 60a. The basic body 54a, 56a has a diameter of 70 mm and a thickness of 5 mm. The diameter corresponds to a main extent of the second wall element 20a, 22a. The diameter of the basic body 58a, 60a of the second wall element 20a, 22a corresponds to the diameter of the basic body 54a, 56a of the first wall element 16a, 18a. The first wall element 16a, 18a and the second wall element 20a, 22a have a common axis. The first wall element 16a, 18a and the second wall element 20a, 22a are arranged parallel and coaxially to each other. The fluid chamber 24a, 26a, which is provided for receiving a process gas, is arranged between the wall elements 16a, 18a, 20a, 22a in the axial direction. The fluid chamber 24a, 26a has a height of 1 mm. A process gas is received in the fluid chambers 24a, 26a in each case, wherein a pressure of 100 bar prevails in the fluid chambers 24a, 26a.

The first wall element 16a, 18a has a sealing contour 32a, 34a in the sealing region 28a, which is intended to provide a sealing effect and by means of which a spacing between the wall elements 16a, 18a, 20a, 22a in the sealing region 28a is reduced in relation to a surrounding space 30a of the sealing region 28a. The first wall element 16a, 18a has a surface which faces the second wall element 20a, 22a. The sealing contour 32a, 34a is formed as a bulge on the surface which faces the second wall element 20a, 22a. The second wall element 20a, 22a has a flat, smooth surface in the sealing region 28. The bulge has the shape of an annular solid ridge. The sealing contour 32a, 34a is arranged concentrically to an edge of the first wall element 16a, 18a and to an edge of the second wall element 20a, 22a. The sealing contour 32a, 34a is formed in one piece with the basic body 54a, 56a and has a trapezoidal cross section arranged in the radial direction. The sealing contour 32a, 34a has a height of 1 mm with a form tolerance of 0.05 mm. The first wall element 16a, 18a and the second wall element 20a, 22a each have a sealing surface 36a, 38a, 40a, 42a in the sealing region 28a, which provides a gastight sealing effect.

The sealing contour 32a, 34a has a flank 62a, 64a which leads onto the second wall element 20a, 22a and a flank 66a, 68a which leads away from the second wall element 20a, 22a. The flanks 62a, 64a, 66a, 68a are arranged in a mirror-image manner in relation to each other in a radial direction. The flanks 62a, 64a, 66a, 68a each have an inclination of 30 degrees in relation to the surface of the first wall element 16a, 18a. The sealing contour 32a, 34a has a base 70a, 72a, with a width of 4.5 mm, on the surface of the first wall element 16a, 18a. The sealing contour 32a, 34a has a crest 74a, 76a in a region between ends of the flanks 62a, 64a, 66a, 68a. The crest 74a, 76a has a distance of 24 mm from the axis of the basic body 54a, 56a, 58a, 60a. Double the distance of the crest 74a, 76a from the axis of the basic body 54a, 56a corresponds to a main extent of the fluid chamber 24a, 26a. A main extent of the fluid chamber 24a, 26a is 48 times the height of the fluid chamber 24a, 26a. The crest 74a, 76a has a distance of 11 mm from the edge of the first wall element 16a, 18a. The distance of the crest 74a, 76a from the axis corresponds to a radius of the sealing contour 32a, 34a. The first wall element 16a, 18a has an increased thickness in the region of the sealing contour 32a, 34a and a maximum thickness in the region of the crest 74a, 76a. The sealing surface 40a, 42a of the second wall element 20a, 22a is arranged on the crest 74a, 76a. The first wall element 16a, 18a and the second wall element 20a, 22a are in direct contact with each other in the region of the sealing surfaces 36a, 38a, 40a, 42a. The sealing surfaces 36a, 38a, 40a, 42a are of strip-like design and have a width of 0.5 mm.

The fluid chamber device 10a, 12a has a tensioning part element which provides a pressing force acting upon the sealing surfaces 36a, 38a, 40a, 42a for a pressure-resistant sealing effect. The pressing force elastically deforms the sealing contour 32a, 34a and reduces the height of the sealing contour 32a, 34a by about 0.1 mm, as a result of which a sealing effect in the region of the sealing surfaces 36a, 38a is achieved. The sealing contour 32a, 34a provides a restoring force which corresponds to the pressing force upon the sealing surfaces 36a, 38a. The fluid chamber device 10a, 12a comprises a spacer element 44a, 46a, arranged between the first wall element 16a, 18a and the second wall element 20a, 22a, which is provided for limiting a pressing force upon the sealing surfaces 36a, 38a, 40a, 46a and the sealing contour 32a, 34a, as a result of which a deformation of the sealing contour 32a, 34a lies within an elastic region and a permanent plastic deformation of the sealing contour 32a, 34a is avoided. The spacer element 44a, 46a is designed in the form of a ring and has a rectangular cross section. The spacer element 44a, 46a is arranged outside the sealing contour 32a, 34a in the radial direction. The spacer element 44a, 46a is arranged outside the fluid chamber 24a, 26a in the surrounding space 30a. In principle, it is conceivable that the spacer element 44a, 46a has a cross section in another suitable form and that the fluid chamber device 10a, 12a has a multiplicity of spacer elements 44a, 46a.

The first wall element 16a, 18a has passages—which are not shown—for transporting of process substances. The passages comprise radially oriented tubes and axially extending holes which connect the fluid chamber 24a, 26a to a drain—which is not shown. The second wall element 20a, 22a is provided for connecting the process section 52a to an electric voltage source—which is not shown—and for conducting an electric current into the process section 52a. The second wall element 20a, 22a is also provided for dissipating process heat from the process section 52a. The second wall element 20a, 22a has passages—which are not shown in more detail—which are provided for transporting a cooling medium.

The first fluid chamber device 10a and the second fluid chamber device 12a together form a cell of the electrolyzer (cf. FIG. 1). The cell comprises a membrane 78a which is arranged in the axial direction between the first fluid chamber device 10a and the second fluid chamber device 12a. The first fluid chamber device 10a and the second fluid chamber device 12a are arranged in a mirror-image manner in relation to each other in the axial direction. The first wall element 16a, the fluid chamber 24a and the second wall element 20a of the first fluid chamber device 10a, the membrane 78a, the second wall element 22a of the second fluid chamber device 12a, the fluid chamber 26a and the first wall element 18a of the second fluid chamber device 12a are arranged adjacently to each other in the axial direction. The sealing contour 32a of the first fluid chamber device 10a and the sealing contour 34a of the second fluid chamber device 12a face each other in an installed state. The second wall element 20a of the first fluid chamber device 10a and the second wall element 22a of the second fluid chamber device 12a are connected to different poles of an electric voltage source—which is not shown in more detail—in an operating state of the cell. The second wall element 20a of the first fluid chamber device 10a is connected to a negative pole of the voltage source and the second wall element 22a of the second fluid chamber device 12a is connected to a positive pole.

Arranged in the cell of the electrolyzer are the membrane 78a, which is filled with an electrolyte, and also two electrodes 80a, 82a. A potassium hydroxide solution is used as electrolyte. The membrane 78a is arranged between the second wall element 20a of the first fluid chamber device 10a and the second wall element 22a of the second fluid chamber device 12a. The electrodes 80a, 82a are each formed as a porous section 48a, 50a of the second wall element 20a of the first fluid chamber device 10a and of the second wall element 22a of the second fluid chamber device 12a, which are adjacent to the membrane 78a. During operation, water is fed to the membrane 78a for an electrolytic decomposition according to a known electrolysis reaction. In electrolysis sections 84a, 86a, which are formed by contact regions of the membrane 78a and by an electrode 80a, 82a in each case, hydrogen and oxygen in gaseous form are created as products of the electrolytic decomposition. Hydrogen and oxygen are created in different electrolysis sections 84a, 86a, which are associated with different fluid chambers 24a, 26a, and diffuse by means of the electrodes 80a, 82a into the respective fluid chamber 24a, 26a. By means of drains—which are not shown—the hydrogen and oxygen are directed from the fluid chambers 24a, 26a into gas storage vessels.

Shown in FIG. 3 is a further exemplary embodiment of the invention. The following descriptions and the drawings are limited substantially to the differences between the exemplary embodiments, wherein with regard to similarly designated components, in particular with regard to components with the same designations, reference can also basically be made to the drawings and/or the description of the other exemplary embodiments, in particular of FIGS. 1 and 2. For differentiation between the exemplary embodiments, the letter a is placed after the designations of the exemplary embodiment in FIGS. 1 and 2. In the exemplary embodiment of FIG. 3, the letter a is replaced by the letter b.

FIG. 3 shows a fluid chamber device 10*b* of a redox device 14*b*. The fluid chamber device 10*b* comprises a first wall element 16*b* and a second wall element 20*b*. The wall elements 16*b*, 20*b* delimit a fluid chamber 24*b* and have a sealing region 28*b* which closes off the fluid chamber 24*b* against a gas exchange in relation to a surrounding space 30*b*. The redox device 14*b* is designed as an electrolyzer. The fluid chamber device 10*b* is designed as a half-cell of the electrolyzer.

In contrast to the previous exemplary embodiment, instead of the first wall element 16*b* the second wall element 20*b* has a sealing contour 32*b* in the sealing region 28*b*, which is intended for providing a sealing effect and by means of which a space between the wall elements 16*b*, 20*b* in the sealing region 28*b* is reduced in relation to a surrounding space 30*b* of the sealing region 28*b*. The first wall element 16*b* has a smooth, flat surface in the sealing region 28*b*. The second wall element 20*b* has a surface which faces the first wall element 16*b*. The sealing contour 32*b* is formed as a bulge on the surface facing the first wall element 16*b*. The bulge has the shape of a wave. The sealing contour 32*b* is arranged concentrically to an edge of the first wall element 16*b* and to an edge of the second wall element 20*b*. The sealing contour 32*b* is formed in one piece with the basic body 54*b* and has a hood-like cross section which is arranged in the radial direction. The sealing contour 32*b* has a height of 1 mm with a form tolerance of 0.05 mm. The bulge forms a groove on a side facing away from the first wall element 16*b*.

The first wall element 16*b* and the second wall element 20*b* have a sealing surface 36*b*, 40*b* in the sealing region 28*b*, which provides a gastight sealing effect. The sealing contour 32*b* has a flank 62*b* leading onto the first wall element 16*b* and a flank 66*b* leading away from the first wall element 16*b*. The flanks 62*b*, 66*b* are arranged in a mirror-image manner in relation to each other in a radial direction. The flanks 62*b*, 66*b* each have an inclination of 45 degrees in relation to the surface of the second wall element 20*b*. The sealing contour 32*b* has a base 70*b* with a width of 3 mm on the surface of the second wall element 20*b*. The sealing contour 32*b* has a crest 74*b* in a region between ends of the flanks 62*b*, 66*b*. The crest 74*b* has a distance of 24 mm from the axis of the basic body 54*b*. The crest 74*b* has a distance of 11 mm from the edge of the second wall element 20*b*. The distance of the crest 74*b* from the axis corresponds to a radius of the sealing contour 32*b*. The second wall element 20*b*, in the region of the sealing contour 32*b*, has a basically constant thickness in comparison to a surrounding of the sealing contour 32*b*. Arranged on the crest 74*b* are the sealing surface 40*b* of the second wall element 20*b* and the sealing surface 36*b* of the first wall element 16*b*. The first wall element 16*b* and the second wall element 20*b* are in direct contact with each other in the region of the sealing surfaces 36*b*, 40*b*. The sealing surfaces 36*b*, 40*b* are of strip-like design and have a width of 0.5 mm.

The invention claimed is:

1. A fluid chamber device for a reaction unit of a redox device, comprising:
    at least one first wall element and at least one second wall element, which at least partially delimit a fluid chamber;
    a sealing region which closes off the fluid chamber from a fluid exchange, in particular a gas exchange, in relation to a surrounding space; and
    at least one electrode, which together with the at least one first wall element and the at least one second wall element, at least partially delimits the fluid chamber,
    wherein at least one of the wall elements, in an installed state, has at least one sealing contour in the sealing region, which sealing contour is intended for providing a sealing effect and by means of which, a spacing of the at least two wall elements in the sealing region is reduced in relation to a surrounding area of the sealing region,
    wherein the at least two wall elements are in direct contact with each other in the region of the sealing contour,
    wherein the sealing contour is embodied in a one-part-implementation with the at least one first wall element, and
    wherein the at least one first wall element and the sealing contour are made of a same material.

2. The fluid chamber device according to claim 1,
    wherein the at least one first wall element and the at least one second wall element each have a sealing surface in the sealing region, which in an installed state provides a gastight sealing effect.

3. The fluid chamber device according to claim 2,
    wherein the sealing surfaces are each of substantially strip-like design.

4. The fluid chamber device according to claim 3,
    wherein the sealing surfaces have a width of at most 1 mm.

5. The fluid chamber device according to claim 2, further comprising:
    at least one tensioning part element which is designed as a frame which encompasses the fluid chamber device and by screwing action exerts a pressure upon the fluid chamber device, and which provides a pressing force acting upon the sealing surfaces for a pressure-resistant sealing effect.

6. The fluid chamber device according to claim 5, further comprising:
    at least one spacer element arranged between the at least one first wall element and the at least one second wall element, which spacer element is provided for limiting the pressing force acting upon the sealing surfaces.

7. The fluid chamber device according to claim 2,
    wherein the at least one sealing contour is embodied as a bulge of the at least one wall element, which bulge has a crest on which is arranged the sealing surface of the at least one other wall element.

8. The fluid chamber device according to claim 1,
    wherein the wall elements are implemented from at least substantially different materials.

9. The fluid chamber device according to claim 1,
    wherein a main extent of the wall elements is at least 30 times a height of the fluid chamber.

10. The fluid chamber device according to claim 1,
    wherein at least one of the wall elements has a fluid-permeable partial region.

11. A redox device having at least one first fluid chamber device and at least one second fluid chamber device each according to claim 1.

12. The redox device according to claim 11,
wherein the fluid chamber devices are arranged directly adjacent to each other in a direction which is perpendicular to a main extent.

13. The redox device according to claim 11,
wherein the fluid chamber devices are arranged in a mirror-image manner in relation to each other in a direction which is perpendicular to a main extent.

14. A fluid chamber device for a reaction unit of a redox device, comprising:
at least one first wall element, consisting of an electrical insulating material;
at least one second wall element, consisting of an electrical conductive material;
at least one electrode, which is formed as a section of the second wall element; and
a sealing region, which closes off the fluid chamber from a fluid exchange, in particular a gas exchange, in relation to a surrounding space,
wherein the at least one first wall element, the at least one second wall element and the at least one electrode at least partially delimit a fluid chamber,
wherein the at least one first wall element has, in an installed state, in the sealing region at least one sealing contour, which is intended for providing a sealing effect, and
wherein the at least one first wall element and the at least one second wall element are embodied of a material which is different from a rubber-like elastic material.

15. The fluid chamber device according to claim 14,
wherein the sealing contour is embodied in an one-part-implementation with the at least one first wall element, and
wherein the at least one first wall element and the sealing contour are made of a same material.

16. The fluid chamber device according to claim 1, further comprising
at least one spacer element arranged between the at least one first wall element and the at least one second wall element, which spacer element is provided for limiting the pressing force acting upon the sealing surfaces and which has a material elasticity which is lower than a lowest material elasticity of the at least one first wall element and/or the at least one second wall element.

17. The fluid chamber device according to claim 1, further comprising
at least one membrane which is arranged at least partially in the at least one second wall element.

18. The fluid chamber device according to claim 17,
wherein the at least one second wall element comprises at least one receiving region in which the at least one membrane is arranged, and
wherein the at least one membrane directly abuts on the at least one second wall element.

19. The fluid chamber device according to claim 1,
wherein the electrode is formed as a section of the at least one second wall element and is partially embodied in an one-port-implementation with the at least one second wall element.

20. A fluid chamber device for a reaction unit of a redox device, comprising:
at least one first wall element and at least one second wall element, which at least partially delimit a fluid chamber;
a sealing region which closes off the fluid chamber from a fluid exchange, in particular a gas exchange, in relation to a surrounding space; and
and at least one electrode, which together with the at least one first wall element and the at least one second wall element at least partially delimits the fluid chamber,
wherein at least one of the wall elements, in an installed state, has at least one sealing contour in the sealing region, which sealing contour is intended for providing a sealing effect and by means of which a spacing of the at least two wall elements in the sealing region is reduced in relation to a surrounding area of the sealing region,
wherein the at least two wall elements are in direct contact with each other in the region of the sealing contour, further comprising at least one membrane which is arranged at least partially in the at least one second wall element,
wherein the at least one second wall element comprises at least one receiving region in which the at least one membrane is arranged, and
wherein the at least one membrane directly abuts on the at least one second wall element.

* * * * *